(12) United States Patent
Blum

(10) Patent No.: US 8,433,281 B1
(45) Date of Patent: *Apr. 30, 2013

(54) EMERGENCY CORDLESS TELEPHONE SYSTEM

(76) Inventor: Alvin S. Blum, Fort Lauderdale, FL (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/931,401

(22) Filed: Feb. 1, 2011

(51) Int. Cl.
*H04M 11/04* (2006.01)

(52) U.S. Cl.
USPC .................................. 455/404.1; 379/142.02

(58) Field of Classification Search ............... 455/404.1, 455/414.1, 404.2, 456.6, 411; 340/539.12; 379/142.02, 37–52
See application file for complete search history.

(56) References Cited

U.S. PATENT DOCUMENTS

| | | | | |
|---|---|---|---|---|
| 4,878,236 A * | 10/1989 | Ray et al. | ........................ | 379/37 |
| 4,993,058 A * | 2/1991 | McMinn et al. | ................ | 379/37 |
| 5,305,370 A * | 4/1994 | Kearns et al. | .................. | 379/45 |
| 5,491,745 A | 2/1996 | Roeder | | |
| 5,710,803 A * | 1/1998 | Kowal et al. | ..................... | 379/41 |
| 5,748,706 A | 5/1998 | Morgan | | |
| 5,790,019 A | 8/1998 | Edwin | | |
| 5,960,061 A * | 9/1999 | Fahie et al. | ..................... | 379/37 |
| 6,114,948 A * | 9/2000 | Astell | .......................... | 340/332 |
| 6,173,169 B1 | 1/2001 | Oh | | |
| 6,205,203 B1 | 3/2001 | Gorman | | |
| 6,307,920 B1 | 10/2001 | Thomson | | |
| 6,597,924 B1 | 7/2003 | Smith | | |
| 6,870,906 B2 * | 3/2005 | Dawson | ......................... | 379/37 |
| 7,012,544 B2 | 3/2006 | Cunningham | | |
| 7,203,307 B1 * | 4/2007 | Suehiro | .................... | 379/355.01 |
| 7,231,200 B2 * | 6/2007 | Jenkins | ...................... | 455/404.1 |
| 7,355,507 B2 | 4/2008 | Binning | | |
| 7,557,704 B2 * | 7/2009 | DeBaugh | ................. | 340/539.16 |
| 2006/0079269 A1 * | 4/2006 | Sorotzkin | .................. | 455/550.1 |
| 2009/0054027 A1 * | 2/2009 | Jenkins | ...................... | 455/404.1 |
| 2010/0194631 A1 * | 8/2010 | Janetis et al. | ............. | 342/357.1 |

* cited by examiner

*Primary Examiner* — Curtis Kuntz
*Assistant Examiner* — Maria El-Zoobi
(74) *Attorney, Agent, or Firm* — Alvin S. Blum

(57) ABSTRACT

A telephone system includes a user-carried emergency communication system in combination with a cordless telephone. The user-carried handset has a large button on a first face. Pressing the button summons help by automatic connection to the 911 emergency telephone network. It also activates a signaling device mounted on the inside glass surface of a window that illuminates a message that 911 has been called. It may also sound an alarm. A pre-recorded massage may also be sent to the emergency call center. The other face has the functions of a cordless telephone. All elements are within the building, with installation by simply plugging cords into power and telephone outlets the same as any cordless phone and mounting the signaling device with suction cups. There are no monthly fees except for the usual cordless phone fee.

4 Claims, 4 Drawing Sheets

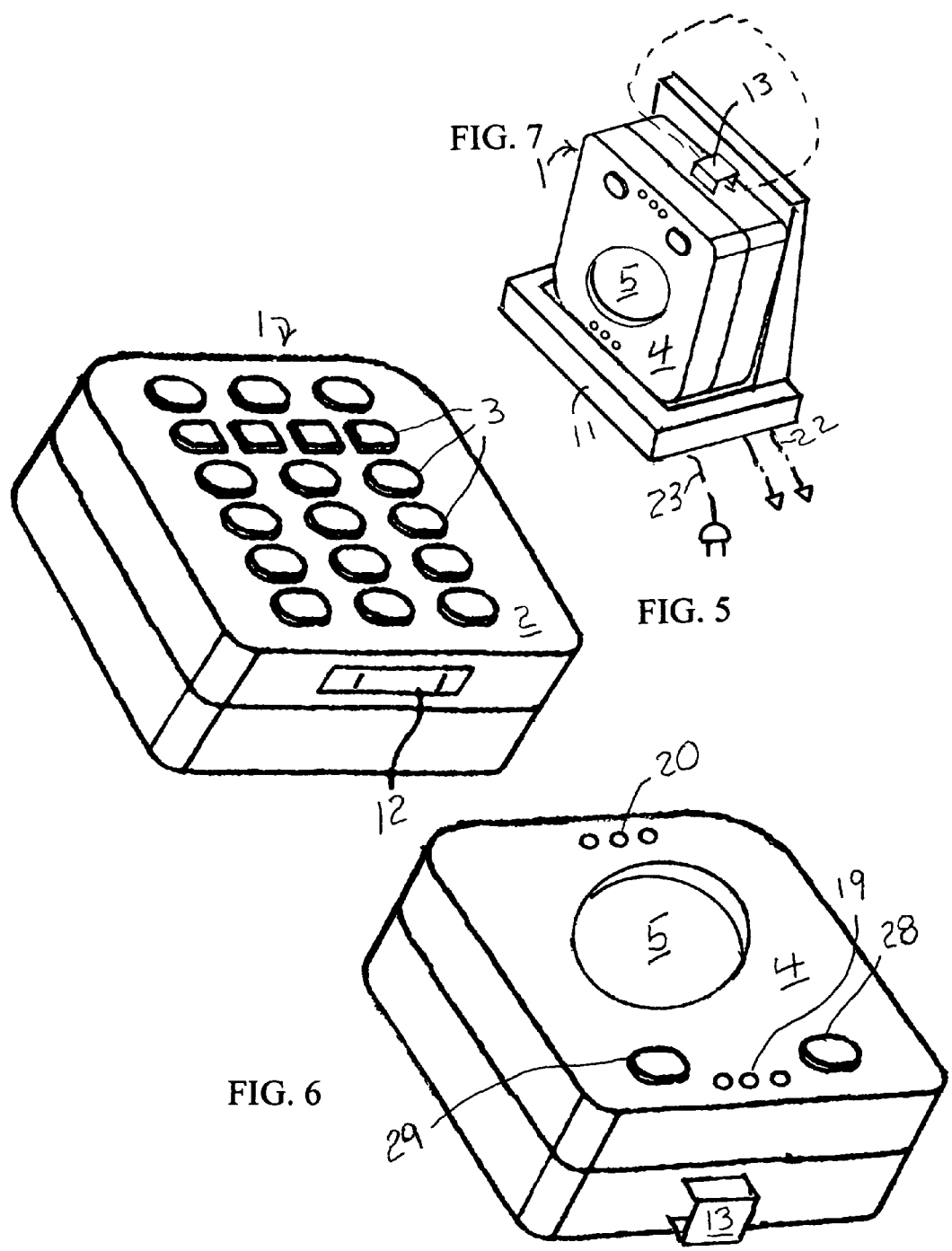

EMERGENCY CORDLESS TELEPHONE SYSTEM

BACKGROUND OF THE INVENTION

The present invention relates generally to a telephone system, and more particularly to a cordless telephone system that provides both conventional cordless telephone operation as well as a special emergency telephone operation. The current emergency service system in operation throughout this country is the 911 emergency service provided through the telephone network. Many individuals find themselves alone in a residence that is equipped with a landline telephone. If they are incapacitated, they may dial 911 for assistance. The network has the ability to locate any residence from which a landline telephone call to the 911 number is made, if the caller is unable to give this information. Infirm users may have difficulty in manipulating the conventional devices in an emergency. Some keypads are now made with enlarged buttons for the elderly. Even when a call is successful and responders reach the address given them, they may not be sure of which door leads to the caller, such as in an apartment building. If no one answers, they may be reluctant to break in, and they may leave without rendering any assistance.

Cordless telephones of the prior art have two wired connections from the base unit, one to the telephone line, and another to a power outlet. The handset communicates with the base unit by short range radio signal. The handset contains a rechargeable battery that is periodically recharged in a charger on the base unit.

McMinn et al., in U.S. Pat. No. 4,993,058 issued Feb. 12, 1991 disclose an emergency signaling system that includes a lighted house number and strobe light on the outside of the house connected by wires to a control box within the house, presumably through one or more holes in the building. The control box senses dialing the emergency number and is connected to the phone line and also a power outlet.

Commercial services provide a panic button to be worn by an individual. The button is pushed in an emergency. This telephones the service provider who then notifies an emergency system to send help, giving the location to which help is to be sent. There is a considerable monthly charge for this service. It does not solve the problem of no one answering a knock on the door. Most in need of this service are the elderly who may not have the funds for this service, and may need help for any installation beyond simple plug in. If they are renters, they may not be permitted to make changes such as holes through the wall.

SUMMARY OF THE INVENTION

This invention provides both a conventional cordless telephone operating system as well as a special emergency telephone operation along with means for alerting those outside a residence that an emergency call has been made. It requires neither special installation nor monthly expenditure outside of the original landline telephone service fees The emergency system of the invention has the same operational functions as the cordless telephones of the prior art. In addition to those functions, it has a connection to an alerting device that attaches to the inside of a window with one or more suction cups. The alerting device emits a light signal indicating that an emergency call has been made. It may also provide an audible signal. The handset of the invention has special features. In addition to the usual handset features on a first broad face, this handset has, on a reverse side, a large button that calls 911. The system senses when the button has been actuated to make a 911 call, and actuates the alerting device that is mounted on the inside glass surface of a window preferably at the front of the residence. This enables the responders to more easily find the caller, and relieves responders of questioning the desirability of breaking in if no one answers. By providing the alerting device on the inside surface of a window, it alerts a responder outside the window, but allows the device to be powered by an inside connection for security and ease of installation. The handset of the instant invention is designed to be compact so as to be conveniently carried, or worn, for example, as a pendant around the neck, on the wrist, or clipped to the clothes with the emergency button outermost. Many elderly people fall when rushing to answer a telephone call. When a call comes in, the user need not rush to a phone, because it is at hand. In the event of a fall or emergency anywhere in the residence, the user need not travel to a phone to get help. The system may be provided with another feature. When a signal indicates that the emergency button has been actuated and a connection to the emergency system has been made, it may send out a pre-recorded message. That audible message may include, for example: a request for help; the location of the premises; that a window is displaying a light and sound signal; next door neighbor in apartment 104 has a key; I have diabetes; and the like. When the user cannot speak, the recorded message will suffice. A recharge station is best provided at the bedside to keep the handset readily available while in bed, and to ensure regular recharging. This may incorporate the base station as well.

These and other objects and advantages will appear from the following description of an illustrative embodiment of the present invention.

BRIEF DESCRIPTION OF THE DRAWINGS

FIG. 5 is a perspective view of the first face of a handset of the invention.

FIG. 6 is a perspective view of the second face of a handset of the invention ready for making an emergency call.

FIG. 7 is a perspective view of the second face of a handset of the invention mounted in a base unit for charging.

DETAILED DESCRIPTION OF PREFERRED EMBODIMENTS

This invention now will be described more fully hereinafter with reference to the accompanying drawing, in which exemplary embodiments are shown. This invention may, however, be embodied in many different forms and should not be construed as limited to the embodiments set forth here. Rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future.

Figure 1:
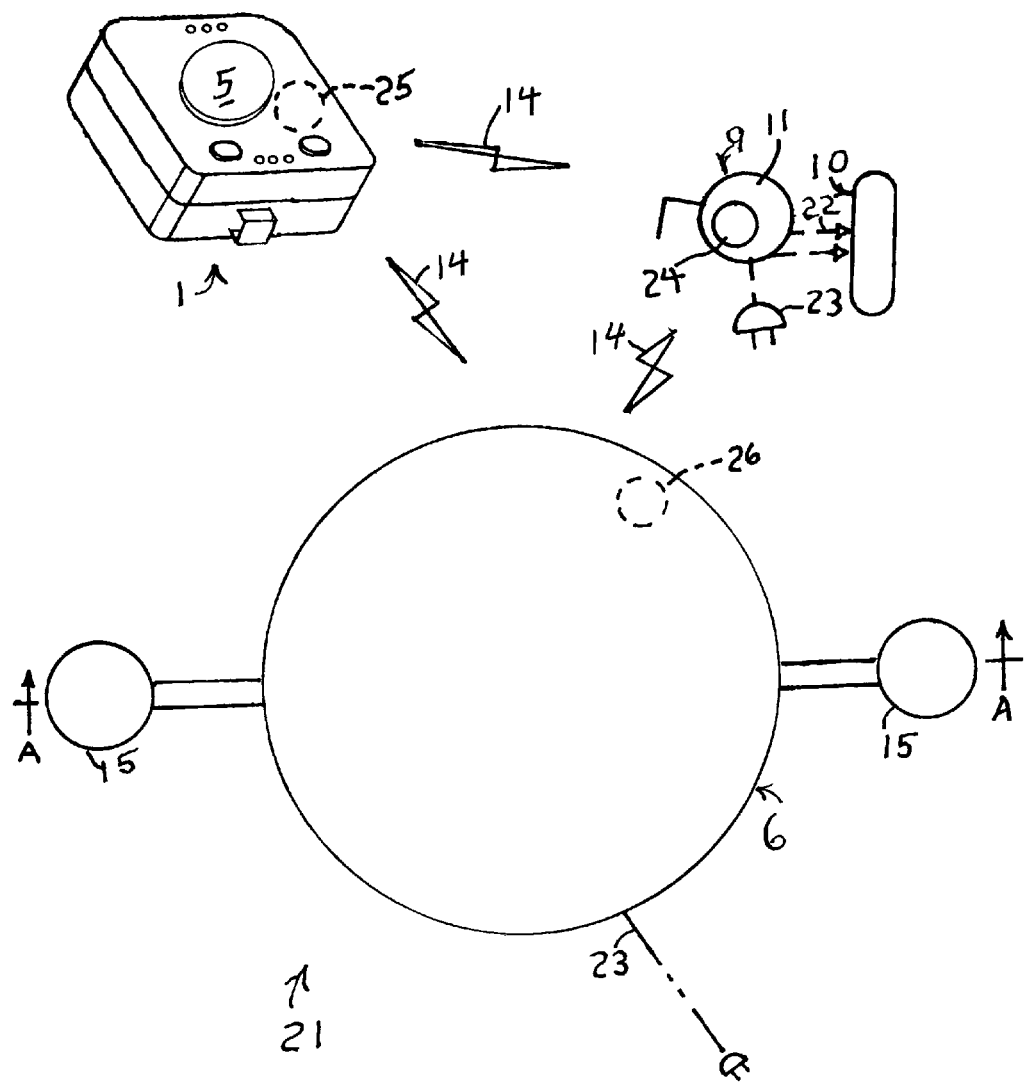
FIG. 1 is a diagram of a cordless telephone system of the invention.
Figure 2:
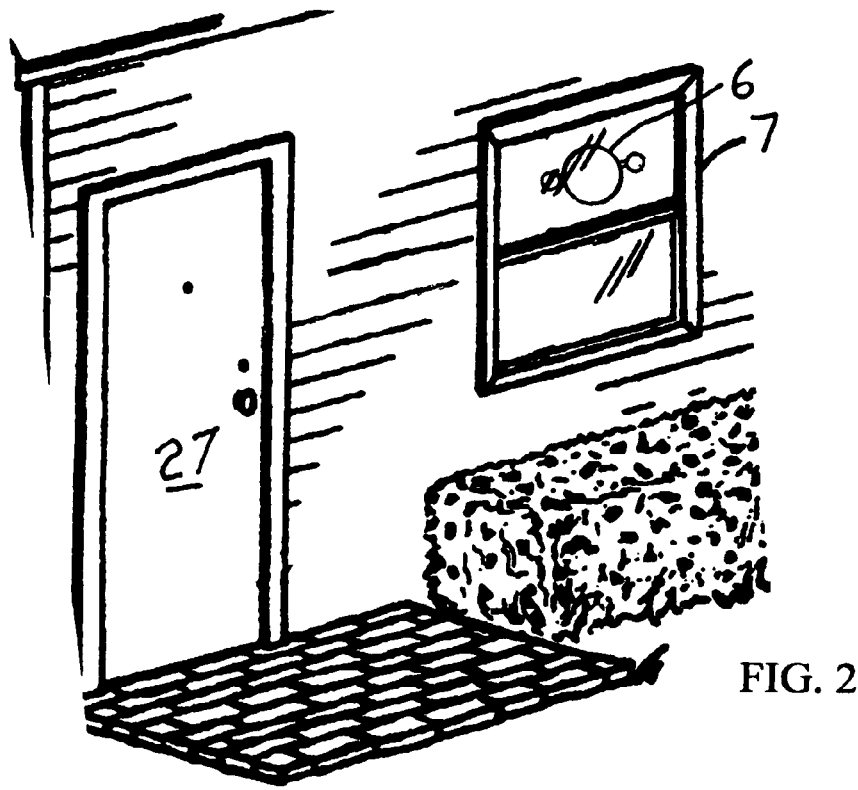
FIG. 2 is a fragmentary pictorial view illustrating an inactive signaling device of the invention visible while mounted on the inside surface of a window of a user adjacent an entry-way.
Figure 3:
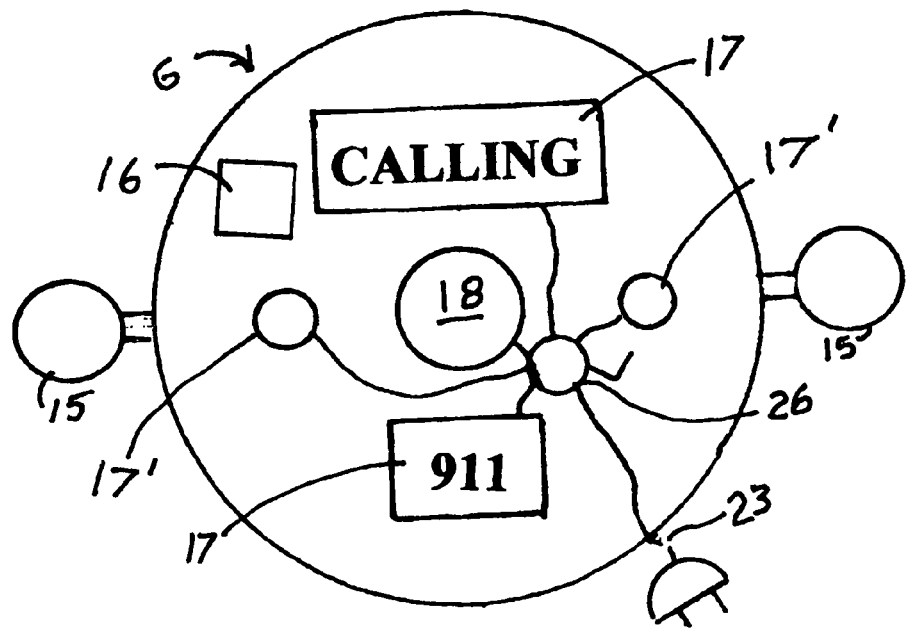
FIG. 3 is a diagrammatic view of the active signaling device as viewed through the window.
Figure 4:
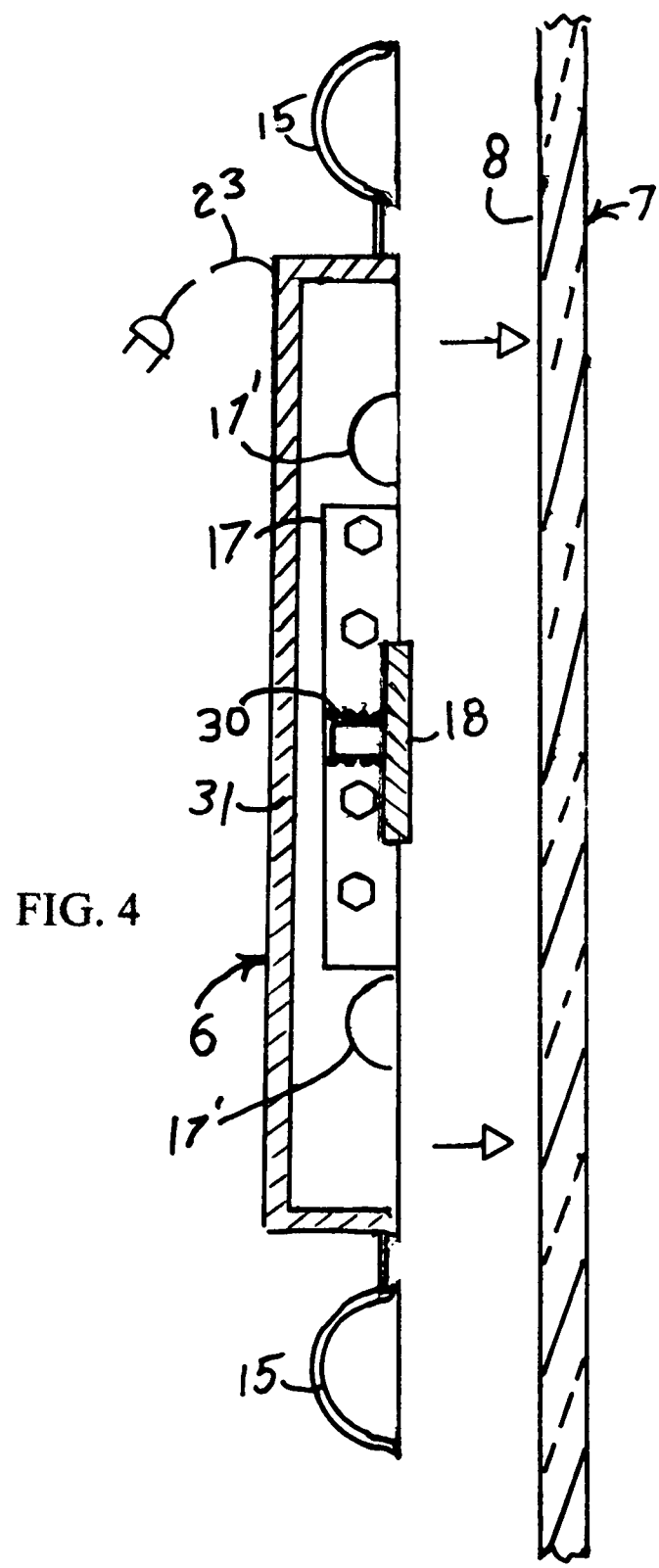
FIG. 4 is a sectional view of the signaling device taken through line A-A of FIG. 1.

Referring now to the drawing FIGS. 1-7, an emergency cordless telephone system 21 of the invention, as shown diagrammatically in FIG. 1, comprises a base unit 9, a handset 1, and a signaling device 6. The base unit 9 includes a transceiver 24 that communicates with a transceiver 25 in the cordless handset 1, and a transceiver 26 in the signaling device by short range radio waves 14 on a bandwidth assigned by the FCC for this purpose.

The base unit has a recharging station 11 that connects to the handset battery 12, a connection 23 to a house power outlet, and connector 22 to the telephone network 10. The recharging station is adapted to present the second face 4 with the emergency button 5 exposed while charging so that it may be positioned at the bedside for easy access while the user is in bed. This also ensures that the battery will be recharged daily before being worn.

The handset 1 has a first broad face 2 provided with a keypad 3 to enable the handset to perform the calling function of handsets of the prior art. A second, opposed broad face 4 is provided with a large, readily accessible emergency call button 5. The button may be recessed or provided with other means to prevent inadvertent actuation, such as, for example, but not limited to, a cover, a time control to only actuate if the button is depressed for a preset time period, and the like. A cancel button 28 may be provided to cancel an emergency call. A microphone 19 and speaker 20 and a talk button 29 may all be available to a user of the second face. A connecting means 13 is provided so that the handset may be worn by the user as a pendant, fastened to the clothing, or with a wrist band with the second face outermost. When a call comes in, the user need only press the talk button to commence a conversation. If the user should fall or encounter some other emergency, they need only press the emergency button to be connected to the 911 operator.

The signaling device 6, as seen in FIG. 1, is best mounted by suction cups 15 on the inside glass surface 8 of a window 7 on the same side of the building as an entryway 27. Device 6 is powered by power connector 23 to house power. It remains inactive until activated by the generation of a call to the emergency number. The call to the emergency number will cause a signal 14 to be emitted from either the handset 1 or the base unit 9 that will be received by transceiver 26 in the signaling device 6 that will cause the message "calling 911" to be illuminated at lighting boxes 17, Also strobe lights 17' may be operated to get the attention of responders, if desired. The device may also be provided with a sound generator 18 that is pressed against the glass to attract attention. Sound generator 18 may be pressed against the glass by spring 30 so that the sound will be better heard outside, and sound absorbing materials 31 may reduce the sound indoors. The cancel button 28 on the handset may be used to inactivate the signaling device. A pre recorded message facility 16 may be mounted in any one of the base, handset, or signaling device for actuation when a 911 call is made to deliver a prerecorded massage to the responder.

Many cordless phones also include a visual display for caller ID use. Some also include message recording features. One or all of these additional features may optionally be incorporated into the instant invention. They may be omitted in the interest of making the handset more easily carried. Alternatively, they may be incorporated into the base unit, and/or incorporated into a larger handset that may be stored in the recharger of the base unit in addition to the more compact handset to be carried or worn by the user.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A cordless telephone system comprising:
a) a handset having a first broad face provided with a keypad adapted to perform cordless telephone handset functions, and a second opposed broad face provided with an emergency call button, a microphone, and a speaker;
b) a base unit connectable to house power and connectable to a telephone network line for receiving and transmitting signals there through, the base unit having a recharging station adapted to receive the handset for recharging while exposing the emergency call button of the handset during charging;
c) a light and sound emitting signaling device connectable to indoor house power and provided with at least one suction cup for attaching to an inside glass surface of a window, and means to press a sound generating element against the glass;
d) the handset having a rechargeable battery and adapted to be worn by a user;
e) the base unit and the handset provided with means for the reception and transmission of signals there between with short range radio waves;
f) means to generate a special signal from actuation of the emergency call button and to respond to that signal by connecting the handset to an emergency telephone number on the telephone network line, and to actuate the signaling device;
g) a pre-recorded message facility for storing an audible message and for transmission of the audible message to the emergency system when connection to the emergency system has been established by actuation of the emergency button; and
h) means to deactivate the signaling device as desired.

2. A cordless telephone system comprising:
a) a handset having a first broad face provided with a keypad adapted to perform cordless telephone handset functions, and a second opposed broad face provided with an emergency call button;
b) a light and sound emitting signaling device connectable to indoor house power and provided with attaching means for attaching to an inside surface of a window;
c) a base unit connectable to house power and to a telephone network line for receiving and transmitting signals therethrough and having a recharging station adapted to receive the handset for recharging while exposing the emergency call button of the handset during charging;
d) the handset having a rechargeable battery and adapted to be worn by a user;
e) the base unit and the handset provided with means for the reception and transmission of signals there between with short range radio waves;
f) means to generate a special signal from actuation of the emergency call button and to respond to that signal by connecting the handset to an emergency telephone number on the telephone network line, and to actuate the signaling device; and
g) means to deactivate the signaling device as desired.

3. The cordless telephone system of claim 2 in which the attaching means comprises at least one suction cup.

4. The cordless telephone system of claim 3 further comprising a pre-recorded message facility for storing an audible message and for transmission of the audible message to the emergency system when connection to the emergency system has been established.

\* \* \* \* \*